United States Patent [19]

Kammermaier et al.

[11] 4,320,655
[45] Mar. 23, 1982

[54] QUANTITY OF FLOW METER

[75] Inventors: Johann Kammermaier, Unterhaching; Rüdiger Mueller, Munich; Peter Roedl, Rosenheim, all of Fed. Rep. of Germany

[73] Assignee: Siemens Aktiengesellschaft, Berlin & Munich, Fed. Rep. of Germany

[21] Appl. No.: 143,352

[22] Filed: Apr. 24, 1980

[30] Foreign Application Priority Data

Jun. 27, 1979 [DE] Fed. Rep. of Germany ....... 2925975

[51] Int. Cl.³ .............................................. G01F 1/68
[52] U.S. Cl. ...................................................... 73/204
[58] Field of Search .......................................... 73/204

[56] References Cited

U.S. PATENT DOCUMENTS 3,931,736 1/1976 Olmstead ............................... 73/204
3,991,613 11/1976 Adler et al. ....................... 73/861.22

FOREIGN PATENT DOCUMENTS 839615 6/1960 United Kingdom ................... 73/204

OTHER PUBLICATIONS

Bosch Technical Reports 5 (1975)—p. 20.

*Primary Examiner*—Charles A. Ruehl
*Attorney, Agent, or Firm*—Hill, Van Santen, Steadman, Chiara & Simpson

[57] ABSTRACT

A quantity of flow meter, includes two electrical conductors which are traversed by current and are physically traversed by a flowing medium to be measured. The increase of the current required for maintenance of the temperature difference between the two conductors is evaluated as a measurement of the quantity of flow. The meter is particularly versatile and can be employed for a wide voltage range and includes resistors as the electrical conductors which are thin resistor layers applied upon a thin carrier.

10 Claims, 4 Drawing Figures

QUANTITY OF FLOW METER

BACKGROUND OF THE INVENTION

1. Field of the Invention

The present invention relates to a quantity of flow meter, in the case of which a flowing medium is directed past two current carrying conductors which have a temperature-dependent resistance, in the case of which one electrical conductor is heated by the current and serves as a measuring resistor and the second conductor serves as a comparator resistor and is not heated by the current. More specifically, the invention relates to a quantity of flow meter of such type in which further resistors are provided which, together with the measuring resistor and the comparator resistor, form a resistance measuring bridge, and the provision of devices for electronically controlling bridge current in dependence upon the voltage at a bridge tap, the devices regulating the voltage at the bridge tap to zero, the change of bridge current being evaluated as a measurement for the quantity of the flowing medium.

2. Description of the Prior Art

A flow meter of the type set forth above is known from "Bosch Technische Berichte 5 (1975) 1" in which the comparator resistor and the measuring resistor are formed by clamped thin wires. For the comparator resistor, a significantly thinner wire is necessary than for the measuring resistor, so that a comparator resistor can be produced with such a high resistance value that it does not heat to an interfering degree by means of the current flowing therethrough, in contrast to the measuring resistor. The sizes of the wires are set at lower limits because of the necessary mechanical strength of the wires. Therefore, as a result of the small dimensions of the flow meter which are required, the resistance cannot be selected to be so high that a sufficient accuracy of measurement is attained. The dimensions required, for example in motor vehicle construction, of in any case but few centimeters, produce such low resistance values that the bridge can be operated only with voltages in the order of magnitude of 1 V. In the case of such small voltages, for example, in flowing liquids, galvanic voltages between different parts of the circuit, which are to be avoided, come into play. Such voltages cause errors in the measured result in a manner which is not controllable. In flowing gases, for example air, as a result of the low resistance values, in the case of a bridge voltage of 1 V, at the measuring resistance, excess temperatures of about 200 K. arise, which overload the measuring resistance for a long time and are not permissible for many flowing media. In this respect, an excess temperature up to 40 K. is not dangerous, and such a temperature can only be set in the case of resistance wires with bridge voltages significantly below 1 V, whereby the bridges operate inaccurately.

SUMMARY OF THE INVENTION

The object of the present invention is to provide a quantity of flow meter which can be operated with voltages which exclude an interfering influence of galvanic voltages of the circuit parts, and which makes possible a sufficient measurement accuracy in the case of an excess temperature which lies markedly under 200° C.

The above object is achieved, according to the present invention, in that the measuring resistor and the comparator resistor are designed as thin resistor layers which are applied upon a thin substrate.

Quantity of flow meters of this type are less sensitive to dirt accumulation than those having wires, since the measuring resistor and the comparator resistor display a comparatively large surface and a specific dirt accumulation distributes itself upon a larger area, whereby the measurement is influenced to a lesser degree. Because of the large ratio of surface to thickness of the resistor layers, their response time is very short. In addition, a very low excess temperature suffices in order to obtain a current change, which makes possible the measurement of the velocity of flow with the necessary precision. Since the strength of the resistors is not determined by means of the resistor material, as in the case of a construction using resistor wires according to the prior art, resistance values which are higher by a multiple can be housed upon a small available space, so that with the voltages which are present, in motor vehicles, for example 12 V, the quantities flowing can be measured with an accuracy of, for example, ±2%.

The excess temperature at which the precision resistor heats up with respect to the surrounding temperature lies advantageously at 40 K. Thereby, in continuous operation, a thermal overload of the flow meter is avoided and it makes possible the employment of the flow meter for measuring flowing liquids which have relatively low boiling points. The quantity of flow meter is particularly suitable for being used in the motor vehicle sector. It makes possible the continuous measurement of the air and fuel quantities which are necessary for an electronically controlled fuel/air dosage, which quantities are sucked in by internal combustion engines. It provides independent measured values at least in the prescribed temperature range of −35° C.−+150° C. from the temperature of the flowing medium. Its response time, determined within the flow changes up to the $e^{th}$ part, lies by two to three powers of 10 below the limit of the allowable response time of 5 ms.

It is advantageous for a flow measurement in the flow center that the two resistors be arranged one after the other. If a larger flow cross-section is to be encompassed by the measurement, then the precision resistor and the comparator resistor are arranged advantageously next to one another and transversely to the flow direction. For contacting of the resistor paths, advantageously conductive paths are partially vaporized. For this, in particular, copper is suitable, to which connection wires, or respectively, leads, are soldered on.

The measuring resistor advantageously possesses a small resistance value, whereas the comparator resistor has a large resistance value. In the case of connection of a common voltage source, there arises in the comparator resistor a dwindlingly low heating, so that the resistance value does not change in dependence upon the quantity of flow.

A high change in resistance in the heat abstraction by means of the flow is attained by the formation of the measuring resistor out of nickel. The resistance value of the measuring resistor is advantageously smaller by at least the factor 10 than that of the comparator resistor. The comparator resistor is advantageously formed as a meander-shaped metal layer, particularly if the longitudinal expanse of the comparator resistor is not to be larger than that of the measuring resistor. Thereby, the comparator resistor and the measuring resistor advantageously consists of the same material. Therefore, the temperature influence is compensated in a simple manner.

Because of the short response time of the flow meter constructed in accordance with the present invention, it is possible and practical to coat the resistor layers with a thin lacquer layer out of an antiadhesive substance, preferably, out of a silicon resin, for example, 0.5 $\mu$m–1 $\mu$m thick, for the avoidance of deposits of dirt. A protective layer of this sort increases the response time insignificantly. For example, in the case of a 25 nm thick nickel resistor layer, the response time changes from $10^{-6}$ s to $5 \times 10^{-6}$ s, and the response time thus does not come into the order of magnitude of the permissible limit.

The temperature of the flowing medium is essentially eliminated in the case of the proposed flow meter by means of the bridge principle; however, it enters in, though indirectly, to the excess temperature. For the exclusion of this influence, the current which is supplied to the bridge must be varied with the temperature. If, in addition, the temperature of the flowing medium is to be determined directly, advantageously a temperature-dependent resistor is used. This resistor is loaded with a constant low current which does not raise the resistance, so that the voltage drop at this resistor is a measurement for the temperature. This additional resistor is advantageously formed from a vaporized metal layer, from which also measuring resistor and the comparator resistor are formed, and it lies in its own circuit, independent of the bridge current.

A rational manufacturing in series (quantity production) of the resistors is provided by means of an embodiment in which the measuring resistor and the comparator resistor are applied upon a thin carrier and are connected with one another in one piece and in which the thin carrier is glued onto a reinforcement substrate. The resistors can be manufactured by means of a known foil evaporation method in the moving tape technique, as well as the photo etching or screen printing techniques and can be glued together with the reinforcement substrate only shortly before completion. The ratio of width to thickness of the resistor layer of the measuring resistor is advantageously at least 10:1 in order to attain a short response time.

The reinforcement substrate is perforate in the region of the resistor layers, whereby the remaining parts of the reinforcement substrate forms a frame and the thin carrier is clamped on the frame. Thereby, the direct basis of the resistors displays a comparatively low thermal capacity, so that the excess temperatures which are required for the flow measurement in the measuring resistor can be produced with relatively narrow (for example, 0.5 mm wide) paths of the same, and correspondingly low currents pass therethrough, for example $\leq 0.5$ A. The necessary mechanical strength of the flow meter is guaranteed completely by means of this window-like form of the reinforcement substrate.

In order to avoid a mutual influencing of the measuring resistor and the comparator resistor, the carrier is connected with the thin resistor layer between the measuring resistor and the comparator resistor with a central rib as a heat sink in a materially bonded manner. The central rib can be a metal layer which is directy vapor deposited onto the resistor layer, the metal layer simultaneously being employed as a contact surface. It can also, where applicable, additionally be formed by a rib of the reinforcement substrate or by a plastic cross piece which is glued on.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
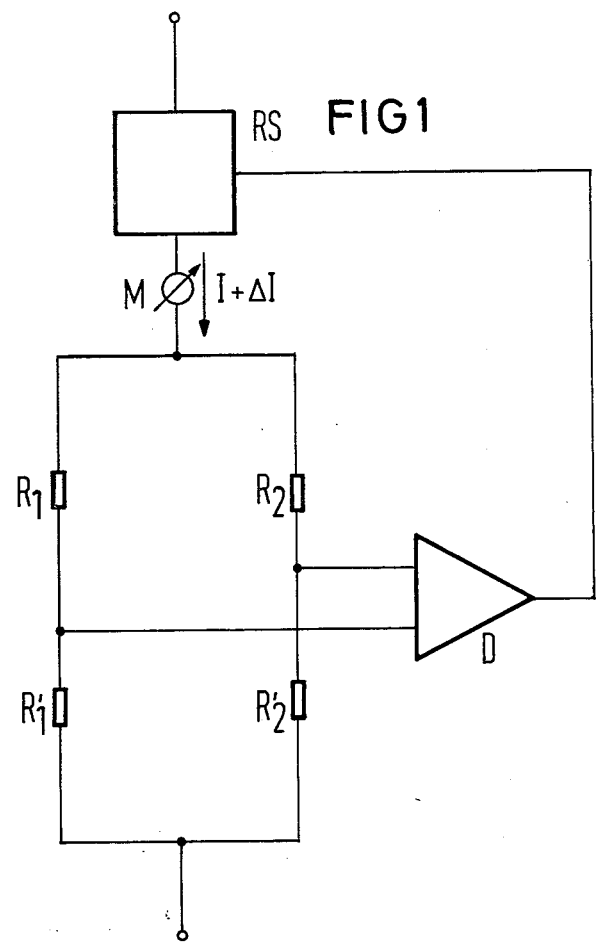
FIG. 1 is a schematic circuit diagram of a measuring bridge constructed in accordance with the present invention.

Referring first to FIG. 1, a bridge is illustrated which comprises a plurality of resistors $R_1$, $R_2$, $R_1'$ and $R_2'$. A differential amplifier D has its inputs connected to taps of the bridge and causes a bridge balance by way of a regulator circuit RS by means of change of the bridge current I by the differential current $\Delta I$. A measuring device M illustrates the differential current $\Delta I$ or, respectively, the quantity of flow of the medium corresponding to the differential current $\Delta I$.

Figure 2:
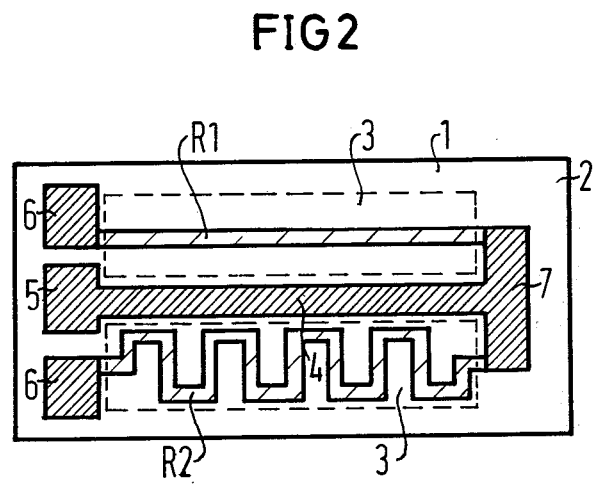
FIG. 2 is a plan view of a measuring resistor and a comparator resistor constructed in accordance with the present invention.
Figure 3:
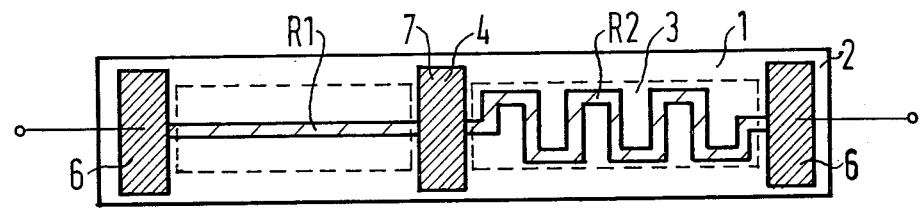
FIG. 3 is a plan view of a measuring resistor and a comparator resistor constructed in accordance with the invention.
Figure 4:
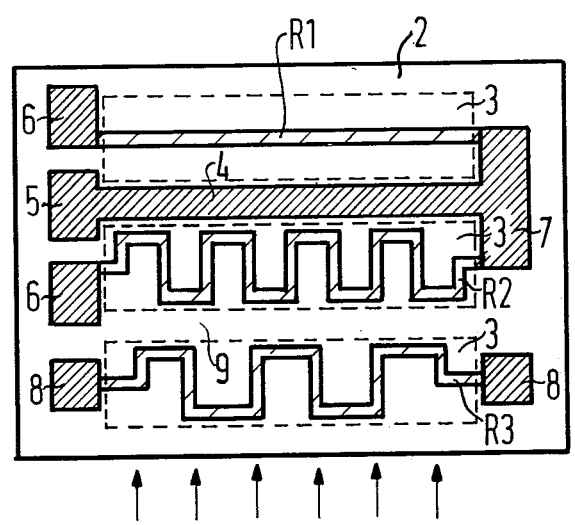
FIG. 4 is a plan view of a measuring resistor, a comparator resistor and a temperature compensating resistor constructed in accordance with the invention.

In FIGS. 2–4, the resistor paths are broadly hatched and the contact surfaces are narrowly hatched for the purpose of clarity and not to indicate sectioning.

Referring to FIG. 2, a measuring resistor R1 and a comparator R2 are arranged next to one another on a thin carrier 1, which preferably comprises a plastic layer. The carrier 1 is connected in a materially bonding manner with a reinforcement substrate. The reinforcement substrate 2 includes recesses 3 in the region of the resistors R1 and R2. The recesses provide for very short response times of the quantity of the flow measuring device. The current feed proceeds from a contact surface 5, a conductive path located upon a central rib 4, and a contact surface 7. The central rib 4 prevents a mutual thermal influencing of the resistors R1 and R2. The central rib 4 comprises a rib in the reinforcement substrate 2, the part of the carrier 1 which lies thereover and the conductive path which is applied on the carrier 1 for the current feed. This embodiment can be designed relatively small and is particularly suitable for the arrangement transverse to the direction of flow of the medium. It thereby encompasses a large part of the flow cross-section. All connections 5 and 6 can be tapped on one side.

Referring to FIG. 3, the resistors R1 and R2 are arranged one after the other. The central rib 4 again prevents a mutual thermal influencing of the resistors R1 and R2. It simultaneously represents the contact surface 7, which connects the two resistors with one another. The bridge tap is provided by the contact surfaces 6.

Referring to FIG. 4, the resistors R1 and R2 are constructed in the same manner as in FIG. 2. In FIG. 4, however, the device is supplemented by a resistor R3 which is provided for the purpose of temperature compensation. The resistor R3 also lies over a recess 3 in the reinforcement substrate 2. The connections 8 of the resistor R3 are separated galvanically from the connections 5 and 6. The direction of flow of the flowing medium preferably corresponds to the direction of the arrows. Central ribs 4 and 9 prevent an interfering mutual thermal influencing of the resistors R1, R2 and R3.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a flow meter of the type in which a flowing medium is directed past two electrical conduction elements which have a current passing therethrough, one of the conduction elements constituting a measuring resistor which is heated by the current and the other constituting a comparator resistor which is not heated by the current to any practical extent, and in which the measuring and comparator resistors are for connection in a bridge which has a tap and which is connected to a regulator circuit for controlling the current through the bridge in response to the voltage arising at the tap, the change in bridge current representing the quantity of the flowing medium, the improvement therein comprising:
   a carrier;
   a first thin layer resistor carried on said carrier as said measuring resistor; and
   a second thin layer resistor carried on said carrier as said comparator resistor and having a resistance value which is at least ten times that of said measuring resistor.

2. The improvement of claim 1 and further comprising:
   a reinforcement substrate mounting said carrier; and
   wherein said reinforcement substrate comprises, at least in the area of said resistors, openings and said carrier is bonded to said substrate at areas outside of said openings.

3. The improvement of claim 1, and further comprising:
   a heat sink between said measuring and comparator resistors.

4. The improvement of claim 3, wherein:
   said heat sink comprises metal.

5. The improvement of claim 3, wherein:
   said heat sink comprises a plastic material.

6. In a flow meter of the type in which a flowing medium is directed past two electrical conduction elements which have a current passing therethrough, one of the conduction elements constituting a measuring resistor which is heated by the current and the other constituting a comparator resistor which is not heated by the current to any practical extent, and in which the measuring and comparator resistors are for connection in a bridge which has a tap and which is connected to a regulator circuit for controlling the current through the bridge in response to the voltage arising at the tap, the change in bridge current representing the quantity of the flowing medium, the improvement therein comprising:
   a carrier;
   a first thin layer resistor carried on said carrier as said measuring resistor and comprising a metal layer having a width to thickness ratio by at least 10:1; and
   a second thin layer resistor carried on said carrier as said comparator resistor.

7. In a flow meter of the type in which a flowing medium is directed past two electrical conduction elements which have a current passing therethrough, one of the conduction elements constituting a measuring resistor which is heated by the current and the other constituting a comparator resistor which is not heated by the current to any practical extent, and in which the measuring and comparator resistors are for connection in a bridge which has a tap and which is connected to a regulator circuit for controlling the current through the bridge in response to the voltage arising at the tap, the change in bridge current representing the quantity of the flowing medium, the improvement therein comprising:
   a carrier;
   a first thin layer resistor carried on said carrier as said measuring resistor;
   a second thin layer resistor carried on said carrier as said comparator resistor; and
   a temperature compensation resistor carried on said carrier.

8. The improvement of claim 7, and further comprising:
   a pair of heat sinks on said carrier isolating said resistors from mutual thermal influences.

9. In a flow meter of the type in which a flowing medium is directed past two electrical conduction elements which have a current passing therethrough, one of the conduction elements constituting a measuring resistor which is heated by the current and the other constituting a comparator resistor which is not heated by the current to any practical extent, and in which the measuring and comparator resistors are for connection in a bridge which has a tap and which is connected to a regulator circuit for controlling the current through the bridge in response to the voltage arising at the tap, the change in bridge current representing the quantity of the flowing medium, the improvement therein comprising:
   a carrier in the form of a thin plastic layer dimensioned so that the same will flutter in the flowing medium;
   a first thin layer resistor carried on said carrier as said measuring resistor; and
   a second thin layer resistor carried on said carrier as said comparator resistor.

10. In a flow meter of the type in which a flowing medium is directed past two electrical conduction elements which have a current passing therethrough, one of the conduction elements constituting a measuring resistor which is heated by the current and the other constituting a comparator resistor which is not heated by the current to any practical extent, and in which the measuring and comparator resistors are for connection in a bridge which has a tap and which is connected to a regulator circuit for controlling the current through the bridge in response to the voltage arising at the tap, the change in bridge current representing the quantity of the flowing medium, the improvement therein comprising:
   a frame including a reinforcement substrate having openings therethrough;
   a carrier on said reinforcement substrate covering the openings;
   a first thin layer resistor carried on said carrier spanning one of the openings and constituting said measuring resistor; and
   a second thin layer resistor carried on said carrier spanning another of the openings and constituting said comparator resistor.

* * * * *